United States Patent [19]

Woodard

[11] 4,220,880
[45] Sep. 2, 1980

[54] ADJUSTABLE MOTOR COVER

[76] Inventor: Randle C. Woodard, 20751 Prairie St., Chatsworth, Calif. 91311

[21] Appl. No.: 947,730

[22] Filed: Oct. 2, 1978

[51] Int. Cl.² .......................................... H02K 5/00
[52] U.S. Cl. ...................................... 310/91; 310/89; 52/473; 150/52 R; 220/326
[58] Field of Search ...................... 310/85, 91, 51, 89, 310/88, 40 MM, 52, 58–60, 66; 62/508; 248/674; 312/100; 220/306, 326; 52/473; 150/52 R

[56] References Cited

U.S. PATENT DOCUMENTS

| 1,739,082 | 12/1929 | Simmons | 310/91 UX |
| 2,056,676 | 10/1936 | Kennedy | 310/91 UX |
| 2,594,688 | 4/1952 | Shapiro | 248/674 |
| 2,927,228 | 3/1960 | Rockafield | 310/91 |
| 2,936,140 | 5/1960 | Copeland | 310/40 MM |
| 2,939,297 | 6/1960 | Karger | 310/100 |
| 3,120,883 | 2/1964 | Greiling | 52/473 |
| 3,127,092 | 3/1964 | Shenberger | 310/91 |
| 3,317,124 | 5/1967 | Morrill | 310/51 UX |
| 3,714,795 | 2/1973 | Fowell | 62/508 |
| 4,034,570 | 7/1977 | Anderson | 62/508 |

Primary Examiner—R. Skudy
Attorney, Agent, or Firm—Matthew P. Lynch

[57] ABSTRACT

Provided is an adjustable motor cover designed to protect outdoor electric motors from sun and rain. The cover, made of a plastic material, is open-ended and has a generally LL-shaped configuration and is comprised of a pair of spaced parallel side panels and a top cover formed with longitudinally extending lateral recesses in which the side panels are slidably received. Detachably mounted within the cover interior are a pair of transversely-disposed motor clamps adapted to clampingly embrace an electric motor and, for this purpose, the motor clamps are formed with a base detachably mounted on the top cover inner surface, and concave sections oriented downwardly from the base, the concave sections having a curvature conforming closely to the accurate periphery of the motor accommodated within the clamp concavities. Formed integrally with the top cover inner surface and disposed longitudinally in the plane thereof, are associated pairs of stub-shaped members having slots in which the bases of the motor clamps are slidably received. Depending upon the length of the motor to be covered, each of the motor clamps may be adjustably positioned along the main axis of the top cover by positioning the bases of the clamps in a desired pair of slotted stubs. Projecting outwardly from the concave sections of the motor clamps are side braces which are slidably received in associated pairs of slotted stubs formed integrally with the inner surfaces of the side panels. With respect to the mounting stubs, these upper and lower positioning areas extend in a plane such that smaller or larger clamp areas may be defined between the clamp concavities by aligning a selected positioning area with the slots of the mounting stubs and inserting the side brace end pieces therein.

26 Claims, 6 Drawing Figures

U.S. Patent  Sep. 2, 1980  4,220,880
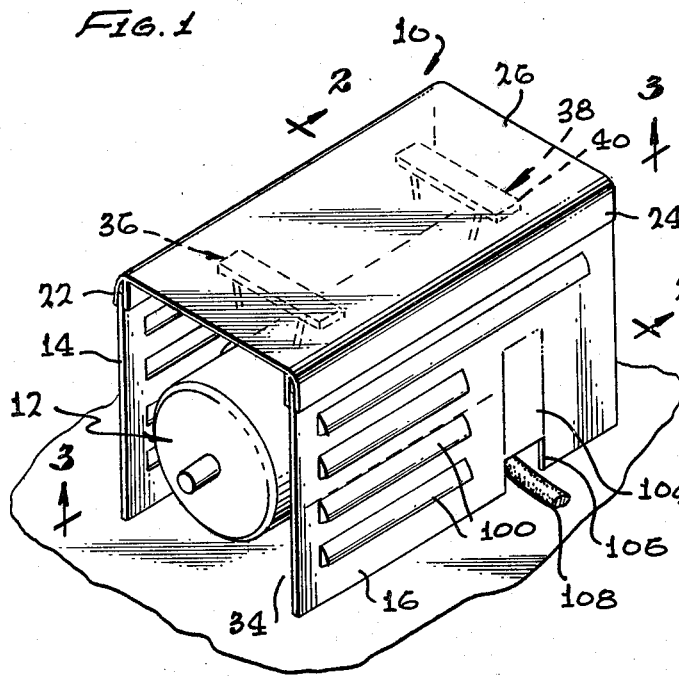
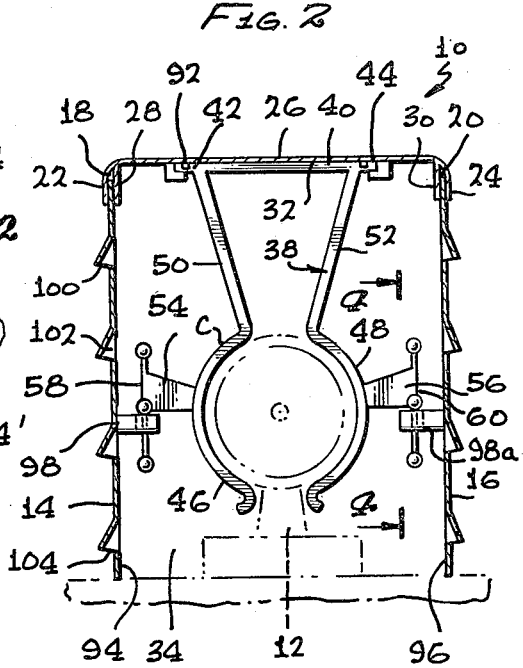
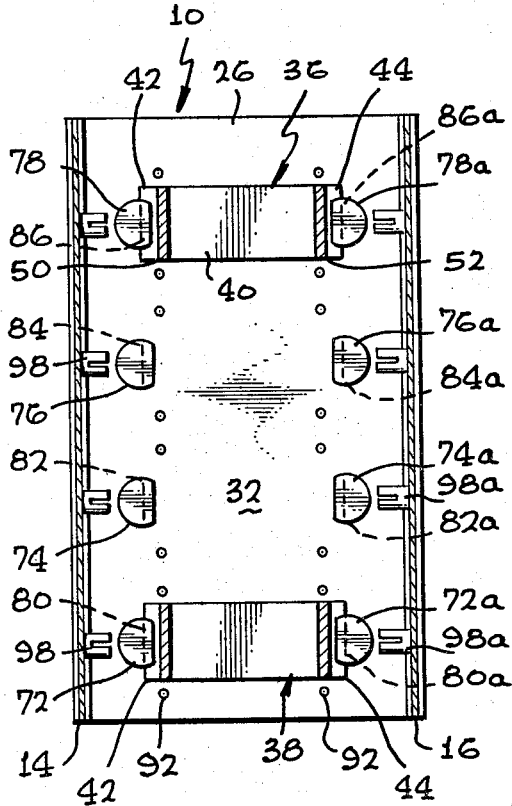
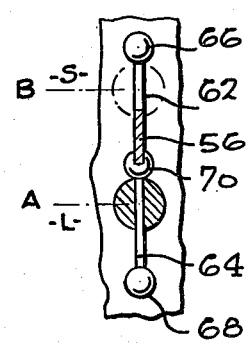
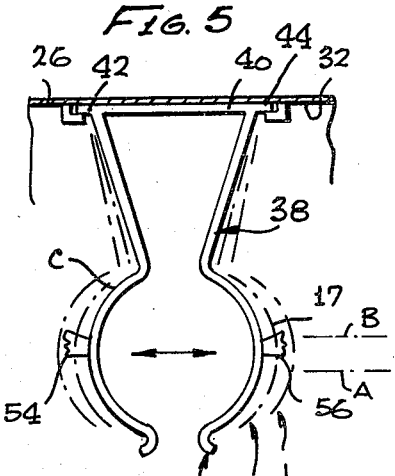
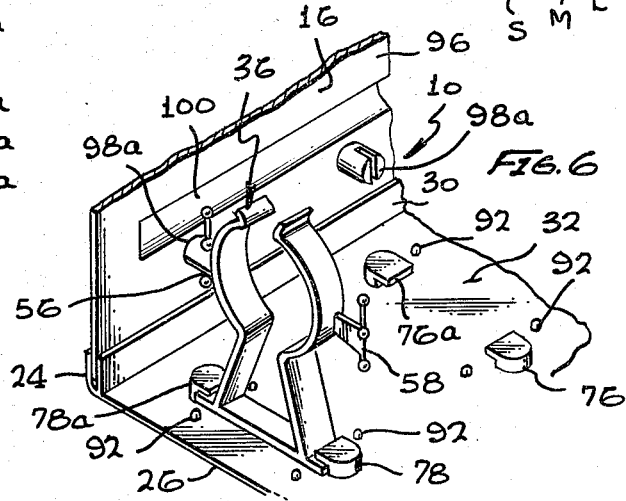

ADJUSTABLE MOTOR COVER

BACKGROUND OF THE INVENTION

1. Field of the Invention:

The present invention relates to a cover assembly especially adapted for use with outdoor electric motors to shut out rain and heat, the protective cover assembly being adjustable to enable motors of different diameter and length to be accommodated within the cover interior.

2. The Prior Art:

Electric drive motors of the type and dimensions utilized, for instance, for swimming pool application, e.g., to drive a swimming pool filter, and ranging from one-third HP to two HP, quite often are mounted outdoors on a mounting slab, or the like, without any form of protection against sun and rain. As a result, water seepage into the motor interior and electrical circuits housed therein, frequently causes short circuits and motor burn-outs. From a standpoint of economics, such damage to the motor represents a costly expenditure as regards the replacement of damaged parts or motors. As a health factor, electrical circuit breakdowns and shorts, especially in a pool environment, are hazardous. Another element causing malfunctioning and/or breakdowns in the electrical circuitry is corrosion of the inner wiring system of the rotor and stator. Such corrosion, in may instances, is a result of hardened conducting elements as well as their insulation. Hardening of these components, in turn, is caused by overheating. As will be appreciated, electric motors positioned outdoors without protective covering, acquire substantial heat from the sun to which they are exposed. This heat, in addition to substantial motor temperature resulting from the rotating element or elements within the motor housing, contributes, to a high degree, to corrosion and hardening of the electrical wiring.

Corroded and pulverized electrical wiring systems, likewise, constitute an enormous health hazard. Also, an electric motor with inner corroded parts, i.e, the rotor or stator windings, needs substantial repair and replacement of such parts.

SUMMARY OF THE INVENTION

Accordingly, it is an object of the invention to provide a means to overcome the aforementioned setbacks and difficulties encountered with electric motors of the outdoor type and used in connection with a swimming pool applications, e.g., to drive the rotary element of a pool filter.

A further object of the invention is to provide such means in the form of a removable, adjustable motor cover adapted especially for use with outdoor electric motors to prevent overheating of the motor due to sun exposure and to unavoidable water seepage into the electrical components during rainfall.

A still further object of the invention is to provide such a motor cover which is easy to assemble, lightweight in construction, and economical in regards to its construction.

Yet another object of the invention is to provide such a motor cover with inner, adjustable, motor-engaging clamps which may be adjustably positioned within the cover interior along the longitudinal axis thereof, thereby to enable the positioning of motors of different lengths within the cover.

To this end, also object of the invention is to provide such a motor cover with inner motor clamps which, in addition to enabling electric motors of different lengths to be positioned within the cover interior, also allow accommodation of electric motors having varying diametric dimensions.

The electric motor cover according to the invention is made of a lightweight, sturdy, yet slightly flexible plastic material and is comprised of a pair of paralled, spaced-apart side panels, a top panel provided with laterally opposite side grooves in which the side panels are slidably received, and a pair of motor clamps detachably positioned within the cover interior, means being provided to enable the motor clamps to be positioned at different locations within the cover interior along the main axis thereof, and means to provide the motor clamps with varying clamping areas to fit motors having different diametric dimensions. Air passages in the form of outwardly downwardly oriented louvers are provided in the side panels, allowing air to flow into the cover interior to cool the motor.

Other objects and advantages will become more readily apparent from the following detailed description, reference being had to the accompanying drawings, in which:

BRIEF DESCRIPTION OF THE DRAWINGS

FIG. 1 is a perspective view of the electric motor cover embodying the present invention, illustrating an electric motor accommodated within the confines of the cover;

FIG. 2 is a cross-sectional view of the electric motor cover taken substantially through a plane indicated by section line 2—2 in FIG. 1;

FIG. 3 is a cross-sectional view taken on line 3—3 of FIG. 1;

FIG. 4 is a cross-sectional view taken on line 4—4 of FIG. 2;

FIG. 5 is a schematic view illustrating the different clamping zones or areas which may be defined between the concave sections of the clamp arms of the invention; and FIG. 6 is a partial perspective view in an inverted position illustrating the top and a side panel and one motor clamp arm and means to adjustably, detachably mount the clamp arms within the motor cover interior.

DESCRIPTION OF THE PREFERRED EMBODIMENT

Referring now to the drawings in which like reference numerals index like parts, and with attention initially directed to FIGS. 1 and 3, there is shown an electric motor cover, referenced generally at 10, adapted especially for use with outdoor electric motors of the type utilized for swimming pool applications and ranging from one-third HP to two HP. By way of example, an electric motor is illustrated in FIGS. 1 and 2, and is referenced by the numeral 12.

Motor cover 10, shown in assembled condition, FIGS. 1 and 2, is seen to comprise a pair of parallel, upright and spaced-apart side panels 14 and 16. Panels 14, 16 are of planar and elongated configurations and are received in grooves 18, 20 at laterally opposite side edges 22, 24 of a top panel or lid 26. As illustrated side edges 22, 24 are curved downwardly through an angle of substantially 90° relative to the generally flat top 26. Grooves 18, 20 are defined by the edges 22, 24 on the one hand, and inner, downwardly oriented projections 28, 30, on the other hand. Projections 28, 30 are formed integrally with the inner surface 32 of the top 26 and extend along the entire length thereof. In assembled condition, cover assembly 10 has a generally U-shaped geometry, and as shown, is open-ended. Mounted within the cover interior 34 defined by side panels 14, 16 and top lid 26, are a pair of motor clamps 36 and 38. The latter members 36, 38 are comprised of a base 40 having subjoining foot portions 42, 44 at its sides, concave sections 46, 48, and supports 50, 52 oriented downwardly from base 40 to concave sections 46, 48, FIG. 2.

Projecting laterally outwardly from concave sections 46, 48 and at diametrically opposite sides thereof, are side braces 54, 56. Braces 54, 56 are formed integrally with sections 46, 48 and are of substantially triangular configuration, with the bases 58, 60 formed into enlarged end sections or ridge formations. Subdividing ridge formations 58, 60 into an upper positioning area 64, are an upper bead 66, a lower bead 68, and an intermediate bead 70; the upper and lower positioning areas 62, 64 are also referenced by the letters S and L, respectively.

As clearly shown in FIGS. 2 and 3, a plurality of associated pairs of slotted tabs 72, 72a, 74, 74a, 76, 76a, and 78, 78a, are aligned in the plane of top cover 26, at the inner surface 32 thereof. Similarly, slots 80, 80a, 82, 82a, 84, 84a, and 86, 86a extend through tabs 72–78a in the axis of cover 26. The slots formed into tabs 72 through 78a have a dimension such as to closely conform to the thickness of foot positions 42, 44 of bases 40, thereby to provide a close fit therewith. At axially opposite sides of each of the slots 80 through 86a, are dotted projections 92, the latter ensuring undesired removal of foot positions 42, 44 from their associated slots. The arrangement to have differently positioned tabs 72–78a enables the motor clamps 36, 38 to be detachably mounted on the inside 32 of top cover 26, and at various locations in the plane thereof. Also, this arrangement provides that motors of different lengths can be positioned and accommodated within interior 34 of cover 10.

Formed integrally with the inner surfaces 94, 96 of side panels 14, 16, FIGS. 2 and 6, are associated pairs of slotted stub members 98, 98a, each adapted to receive a ridge formation 58, 60 on braces 54, 56, to secure concave sections 46, 48 relative to side panels 14 and 16. The stubs members 98, 98a equal the number of tabs 72, 78a and are transversely aligned with these latter members, FIG. 6. In this manner the motor clamps, upon being positioned inside the cover interior, are directed downwardly from inner surface 32 of top cover 26 in a plane normal to the longitudinal axis of the motor cover 10. As may be seen from FIGS. 2 and 5, lower positioning area 64 lies in a plane A while upper positioning area 62 lies in a plane B. In the arrangement shown in FIG. 2, braces 54, 56 are aligned with the slots of stub 98, 98a. This angular position of positioning areas 64 relative to the curvature C of concave sections 46, 48 affords the largest clamping area L, FIG. 5, between the sections 46, 48. In shifting the braces 54 and 56 from positioning areas 64 to positioning areas 62, or plane B, the concave sections 46, 48 are pulled in direction toward one another, thereby reducing the effective clamping region or width from L to S (small), FIG. 5. By placing the positioning areas 64, plane A, of side braces 54, 56 of motor clamp 36 in slotted stub members 98, 98a and the positioning areas 62, plane B, of side braces 54, 56 of motor clamp 38 into their associated, neighboring slotted stubs, an intermediate clamping zone 17, FIG. 5, is obtained. Thus, a motor having a relatively large diametric dimension may be positioned with all of the positioning areas 64, plane A, aligned with stub members 98, 98a. A motor having a substantially smaller diametric dimension may be positioned in similar fashion: however, in this instance, all the positioning surfaces 62 are aligned with the stubs 98, 98a. Finally, a motor of intermediate diametric dimension may be secured within the clamping zones by placing positioning areas 54 of clamp 36 in plane A and positioning areas 62 of motor clamp 38 in plane B. The respective beads 66, 68 and 70 on ridge formations 58, 60 serve to retain the positioning areas 62 and 64 within their associated slots in stub members 98, 98a, and further prevent these areas from shifting within the stub members.

Formed in the parallel, upright panels 14, 16, are a plurality of louvers 100, provided to enable air to enter and circulate within the interior 34 of cover 10, thereby to cool the ambient hot air surrounding motor 12. Louvers 100, as shown in FIGS. 1, 2 and 6, are comprised of slots 102 which are slanted in downward direction relative to the side panels and formed integrally with the latter. Openings 104 are defined between the panel surfaces and slots, the openings, as shown, are relatively narrow and, likewise, are oriented downwardly to shut out rain and sun. The louver formations 100, typically, are arranged one below the other or subjacently in the plane of the panels.

Panels 14, 16, further, are formed with grooved knock-outs 104' enabling electrical cables or conduits to make electrical connection with the motor. FIG. 1 illustrates a partly removed knock-out 106 and an electrical cable 108 extending through the latter knock-out.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is as follows:

1. A protective cover for an outdoor electric motor, said cover comprising:

a housing having a top interconnected with spaced apart side walls, said housing having a main axis longitudinally centrally disposed;

clamping means detachably secured to said top in suspended relation therewith, said clamping means defining a clamping area arrangement, said clamping means adapted to engage a motor located between said side walls, said clamping means comprises a pair of clamps with a single said clamp being located adjacent each said side wall, said clamps comprise a pair of clamping arms with each of said arms defining a concavity;

first means connected to said housing for adjusting the position of a motor relative to said housing;

second means for adjusting said clamping area arrangement, whereby in positioning a motor of a given length, the said first means enable said clamping means to conform to the length of the motor while said second means is to conform with the transverse dimension of the motor.

2. A cover as defined in claim 1 wherein:

said clamping arms further comprise a support connecting said arms with a base.

3. The cover as defined in claim 2 wherein:
said base is subjoined with lateral foot sections for detactable engagement with said first means.

4. The cover as defined in claim 3 wherein:
said first means comprises a plurality of slotted tabs attached to said top in parallel to said side walls and located therebetween.

5. The cover as defined in claim 4 wherein:
said tabs are formed into associated pairs with each said associated pair of tabs being capable of receiving the said lateral foot sections of a said base.

6. The cover as defined in claim 5 wherein:
each said tab has a single slot, said tabs being located in a pair of spaced apart rows, said slots of said tabs within each said row being aligned.

7. The cover as defined in claim 6 wherein:
each said associated pair of said tabs being transversely aligned in a plane normal to said main access of said housing.

8. The cover as defined in claim 7 wherein:
said second means comprises a pair of side braces formed integrally with said clamping arms adjacent said concavities, there being a single said side brace for each said clamping arm, each said side brace to cooperate with a slotted stub member extending inwardly from a said side wall.

9. The cover as defined in claim 8 wherein:
said side braces include end pieces to be aligned and inserted into said slotted stub members.

10. The cover as defined in claim 9 wherein:
said end pieces are ridged and define an upper positioning area and a lower positioning area.

11. The cover as defined in claim 10 wherein:
use of said upper positioning area causes said clamping arms to be located to define a first clamping area and use of said lower positioning area causes said clamping arms to be located to define a second clamping area.

12. The cover as defined in claim 11 wherein:
said first clamping area being smaller than said clamping area.

13. The cover as defined in claim 8 wherein:
there being a plurality of said slotted stub members, said stub members being located in alignment upon each said side wall.

14. The cover as defined in claim 13 wherein:
each said side walls being planar, the slots of said stub members extend in a plane normal to the plane of said side walls.

15. A protective cover for outdoor electric motors comprising:
a housing having a top interconnected with spaced apart side walls, said housing having a main axis longitudinally centrally disposed;
clamping means detachably secured to said top in suspended relation therewith, said clamping means defining a clamping area arrangement, said clamping means adapted to engage a motor located between said side walls;
the first means connected to said housing for adjusting the position of a said motor relative to said housing;
second means for adjusting said clamping area, whereby in positioning of a motor of a given length, said first means enables said clamping means to conform to the length of the motor while said second means is to conform with the cross-sectional dimension of the motor.

16. The cover as defined in claim 15 including:
vent means in said side walls to enable air to enter and circulate between said side walls.

17. The cover as defined in claim 15 including:
passage means formed within said side walls for the conducting therethrough of an electrical cable to the motor.

18. The cover as defined in claim 15 wherein:
said clamping means comprises a pair of clamps with a single said clamp being located adjacent a said side wall.

19. The cover as defined in claim 15 wherein:
said top and said side walls are defined by a pair of parallel planar side panels connected to said top at opposite edges thereof, said opposite edges being grooved in which said side panels are slidably received.

20. The cover as defined in claim 15 wherein:
said housing is open-ended and of a generally U-shaped configuration.

21. The cover as defined in claim 16 wherein:
said vent means is in the form of louvers directed downwardly from said side walls and with the openings of the louvers being oriented downwardly.

22. The cover as defined in claim 17 wherein:
said passage means comprising grooved knock-out sections formed in said side walls.

23. The cover as defined in claim 15 wherein said first means comprises:
a series of members with said clamping means to be selectively connectable to any one of said members thereby achieving the said adjusting of the position of the motor relative to said housing.

24. The cover as defined in claim 15 wherein:
said clamping area arrangement defining a plurality of different size clamping areas with a single said size clamping area to be preselected and fixed by fixing means prior to connection of said housing to the motor.

25. The cover as defined in claim 24 wherein:
said clamping means comprising a pair of clamps which cooperate together about the motor, said second means including flexing of said clamps relative to said housing.

26. The cover as defined in claim 25 wherein:
said fixing means comprising a single side brace attached to each said clamp, each said side brace is to be secured by securing means to a said side wall.

* * * * *